US010095209B2

United States Patent
Chen et al.

(10) Patent No.: US 10,095,209 B2
(45) Date of Patent: Oct. 9, 2018

(54) PROGRAMMING SYSTEM FOR DEVICE CONTROL

(71) Applicants: I Hsueh Chen, Taichung (TW); Jonathan Chen, Taichung (TW); Wei-Huan Chen, Taichung (TW)

(72) Inventors: I Hsueh Chen, Taichung (TW); Jonathan Chen, Taichung (TW); Chien Che Huang, Taichung (TW); Tung Hsiao Chen, Taichung (TW); Shih Ying Chen, Taichung (TW)

(73) Assignees: I Hsueh Chen, Taichung (TW); Jonathan Chen, Taichung (TW); Wei-Huan Chen, Taichung (TW)

( * ) Notice: Subject to any disclaimer, the term of this patent is extended or adjusted under 35 U.S.C. 154(b) by 311 days.

(21) Appl. No.: 14/856,727

(22) Filed: Sep. 17, 2015

(65) Prior Publication Data
US 2016/0224000 A1    Aug. 4, 2016

(30) Foreign Application Priority Data

Jan. 29, 2015    (TW) .............................. 104103060 A

(51) Int. Cl.
G05B 19/42    (2006.01)
G05B 19/042    (2006.01)
H04W 4/80    (2018.01)

(52) U.S. Cl.
CPC .......... *G05B 19/0423* (2013.01); *H04W 4/80* (2018.02)

(58) Field of Classification Search
CPC .................................................. G05B 19/0423
USPC ............................................................ 700/86
See application file for complete search history.

(56) References Cited

U.S. PATENT DOCUMENTS 6,393,591 B1 *    5/2002    Jenkins, IV ........ G06F 11/2294
                                                         714/725
2004/0239622 A1 *    12/2004    Proctor ............... G06F 3/03547
                                                         345/156

FOREIGN PATENT DOCUMENTS

TW    201423125    6/2014
TW    M490072    11/2014

OTHER PUBLICATIONS

Office action of counterpart Taiwanese patent application dated Jun. 17, 2016.

* cited by examiner

*Primary Examiner* — Hoai V Ho
(74) *Attorney, Agent, or Firm* — Che-Yang Chen; Law Offices of Scott Warmuth

(57) ABSTRACT

A programming system for device control is disclosed. The system includes a development board scanning module, a web server, and a working host. An application programming interface packaging module in the working host is a key part to translate high-level programming language codes into low-level programming language codes. Thus, using high-level programming language or interface to implement equipment control or development work becomes feasible.

15 Claims, 4 Drawing Sheets

PROGRAMMING SYSTEM FOR DEVICE CONTROL

FIELD OF THE INVENTION

The present invention relates to a programming system. More particularly, the present invention relates to a programming system utilizing a cloud database to achieve a goal of device control.

BACKGROUND OF THE INVENTION

System development boards used in electronic engineering are a kind of printed circuit boards which include a microprocessor and minimal supported logic circuitry. In addition to allowing engineers to be familiar with the characteristics of a microprocessor and to control the microprocessor by programming codes, system development boards can also be directly utilized to speed up the development of some devices, especially for development of devices having an embedded system. Currently, commercial system development boards in the market, such as Raspberry Pi, Edison development board of Intel (Galileo), LinkIt One platform, and Banana Pi, are developed based on some processor architecture (e.g. ARM or x86). They have certain hardware designs and I/O peripherals. No matter it is for promotion or some appeals, complete specifications of these system development boards are all open to users so that the users are able to continue subsequent development or applications.

Usually, subsequent development or applications of these system development boards is to control the hardware on these system development boards through C programming language or a more low-level language, the assembly language. If the development or applications are communicating with or controlling other devices, for example, remotely controlling a robot for more detailed actions through an available remote control, most systems on the system development board only function or control one specific device, and they are not able to setup and manage more devices at the same time. If a subsequent developed product of the system development board can be applied on more devices with similar functions, or a board which has been developed to apply to one device can be further modified and more widely used in other products and applications, it would be great news to the developers and users. It is not only to reduce development cost (labor and materials cost), but squeezes the time for new products launched into the market. Users enjoy the benefits of familiar interface as the new products are using the similar or the same interface. This is really a breakthrough of the product life cycle.

The requirements mentioned above is subject to a well-known problem: it is difficult to learn and apply a low-level programming language used to control the hardware of devices. The effort to modify a developed board is no less than the effort to develop a new board. High-level programming languages used by the developers, such as JAVA and Objective C, can control some operations of the hardware by current operating system and specific API (Application Programming Interface) provided for the language. However, since there is no specified definition for the operations of hardware or functions not available from the language, programmers must co-operate with hardware engineers who can use the low-level programming language to control the hardware to find a solution. Because the programmers mainly deal with development of the products, user experience and related interface are usually be omitted or special cases can not be taken into consideration, such extra issues need more time to communicate with the hardware engineers to define the requirements and quality assurance. For developers, such situation increases labor cost. However, for now, no matter the programmers and users, they all cannot have an overall understanding of the product and use the low-level programming language to finish development.

Therefore, to reduce the development threshold, it is much desired to construct an easily used architecture and system suitable for every system development based on a low-level programming language and specific development boards. This makes it possible for everyone to use a high-level programming language or interface to finish the management or development of devices.

SUMMARY OF THE INVENTION

This paragraph extracts and compiles some features of the present invention; other features will be disclosed in the follow-up paragraphs. It is intended to cover various modifications and similar arrangements included within the spirit and scope of the appended claims.

In order to settle the problems mentioned above, a programming system for device control is disclosed. The system includes: a development board scanning module, for scanning I/O pins of a development board, acquiring an operating function of the development board, specifications of controllers and hardware, definition of the I/O pins, and functions set for the controllers, recording the acquired data mentioned above in a development board functional database, and transmitting the definition of the I/O pins; a web server, remotely connected with the development board scanning module, including: a device database, for defining and accessing the specifications of controllers and hardware, I/O pins, and functions set for the controllers of a plurality of devices and/or boards; and an instruction database, for accessing instructions for setting the functions for the controllers; and a working host, connected to the development board scanning module and the web server, having the development board functional database for providing a platform for programming codes of a high-level programming language and an application interface used by the high-level programming language to program and control the operating function, and an application programming interface packaging module, for encapsulating the application interface used by the high-level programming language with data in the device database, the instruction database, and/or the development board functional database; wherein the application interface compiles the codes into instructions coded by a low-level programming language used to communicate with the development board after receiving the codes of the high-level programming language.

According to the present invention, the web server judges if the development board has been defined in the device database by the received definition of the I/O pins. If a result of the judgment is yes, record the specifications of controllers and hardware of the defined devices or boards, and functions set for the controllers in the development board functional database. The specifications of controllers and hardware of the defined devices or boards, functions set for the controllers, and instructions for setting the functions for the controllers are provided to the application programming interface packaging module, for encapsulating the application interfaces used by the high-level programming language. If a result of the judgment is no, record the acquired specifications of controllers and hardware of the development board, definition of the I/O pins, and functions set for the controllers in the development board functional database. The specifications of controller and hardware, functions set for the controllers, and instructions with respect to setting the controller functions of the development board acquired by scanning are provided to the application programming interface packaging module, for encapsulating application interfaces used by the high-level programming language.

The operating function is sent to the development board from an external board via a connecting channel. The connecting channel may be a wireless communication interface or a wired transmission interface. The wireless communication interface may be an infrared communication module, a Wi-Fi communication module, a Bluetooth communication module, a RF communication module, a LTE communication module, or a WiMAX communication module. The wired transmission goes through a USB (Universal Serial Bus) port, an eSATA (external Serial Advanced Technology Attachment) port, or a Thunderbolt port. The operating instruction is defined by users.

Preferably, the working host is a laptop computer, a desktop computer, or a tablet. The application programming interface packaging module may be software running in the working host, or hardware installed in the working host.

The application programming interface packaging module in the present invention is a key element to compile codes from a high-level programming language to a low-level programming language. Due to the compilation, it is possible to use an easy high-level programming language or interface to accomplish device control or development.

DETAILED DESCRIPTION OF THE PREFERRED EMBODIMENTS

The present invention will now be described more specifically with reference to the following embodiments.

Figure 1:
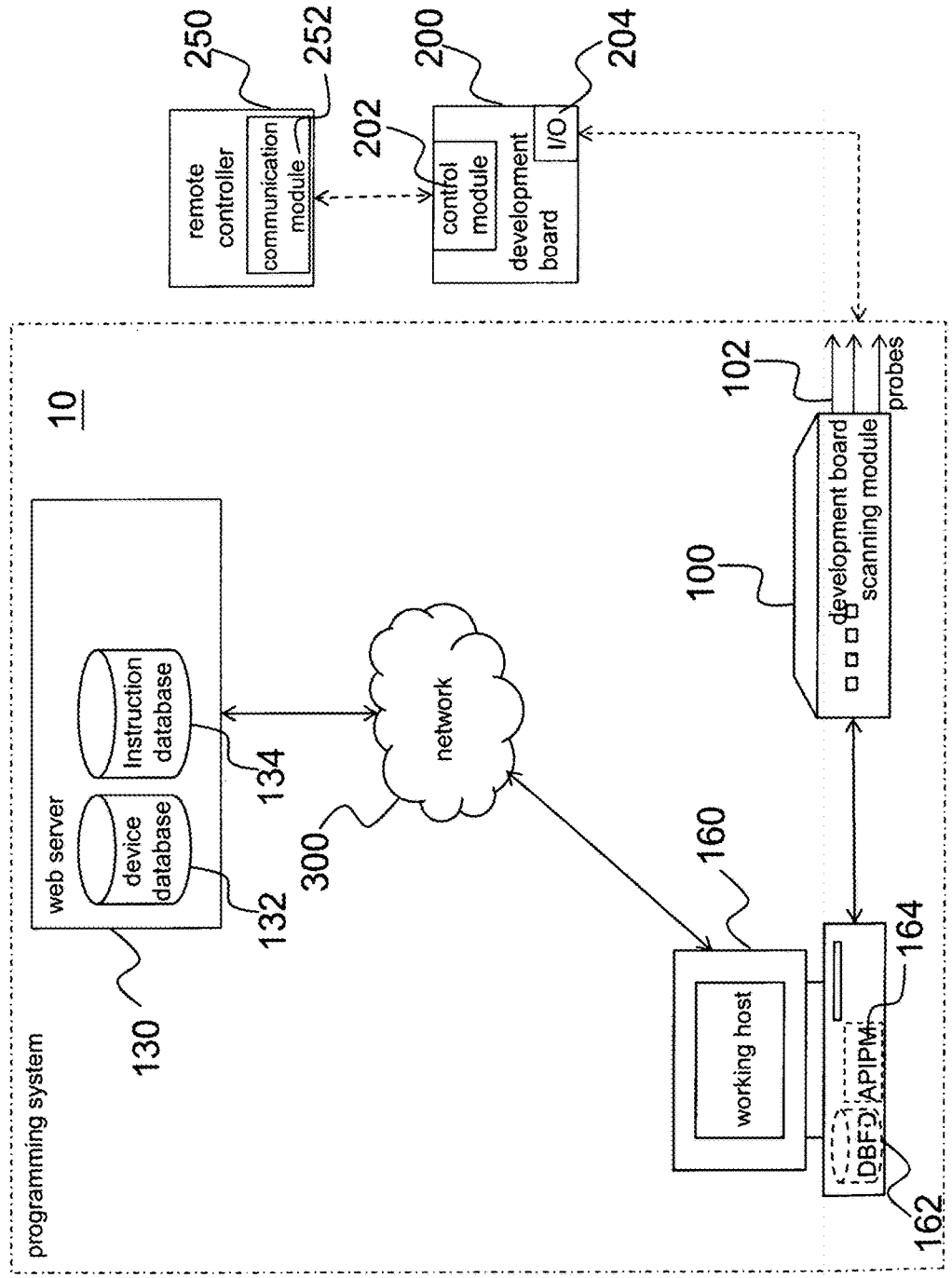
FIG. 1 is a schematic diagram of a programming system for device control according to the present invention.

Please refer to FIG. 1. FIG. 1 discloses a programming system 10 for device control (enclosed by dash-dotted lines) designed according to the present invention. Said programming system 10 is used for development of programs required to control operations of a development board 200. Control programs run on the development board 200, especially a control program for a controller, are mainly programmed by using C programming language or the assembly language. Objects that the aforementioned languages (low-level programming language) communicate with are all hardware. It is difficult to code well. Hence, a purpose of the programming system 10 is to provide a convenient platform for high-level programming languages (i.e. JAVA). The platform can translate codes of the high-level programming languages into the ones programmed by a low-level programming language with the same functions.

The programming system 10 is mainly composed of a development board scanning module 100, a web server 130, and a working host 160. Architecture and functions of the three elements are described below.

Figure 2:
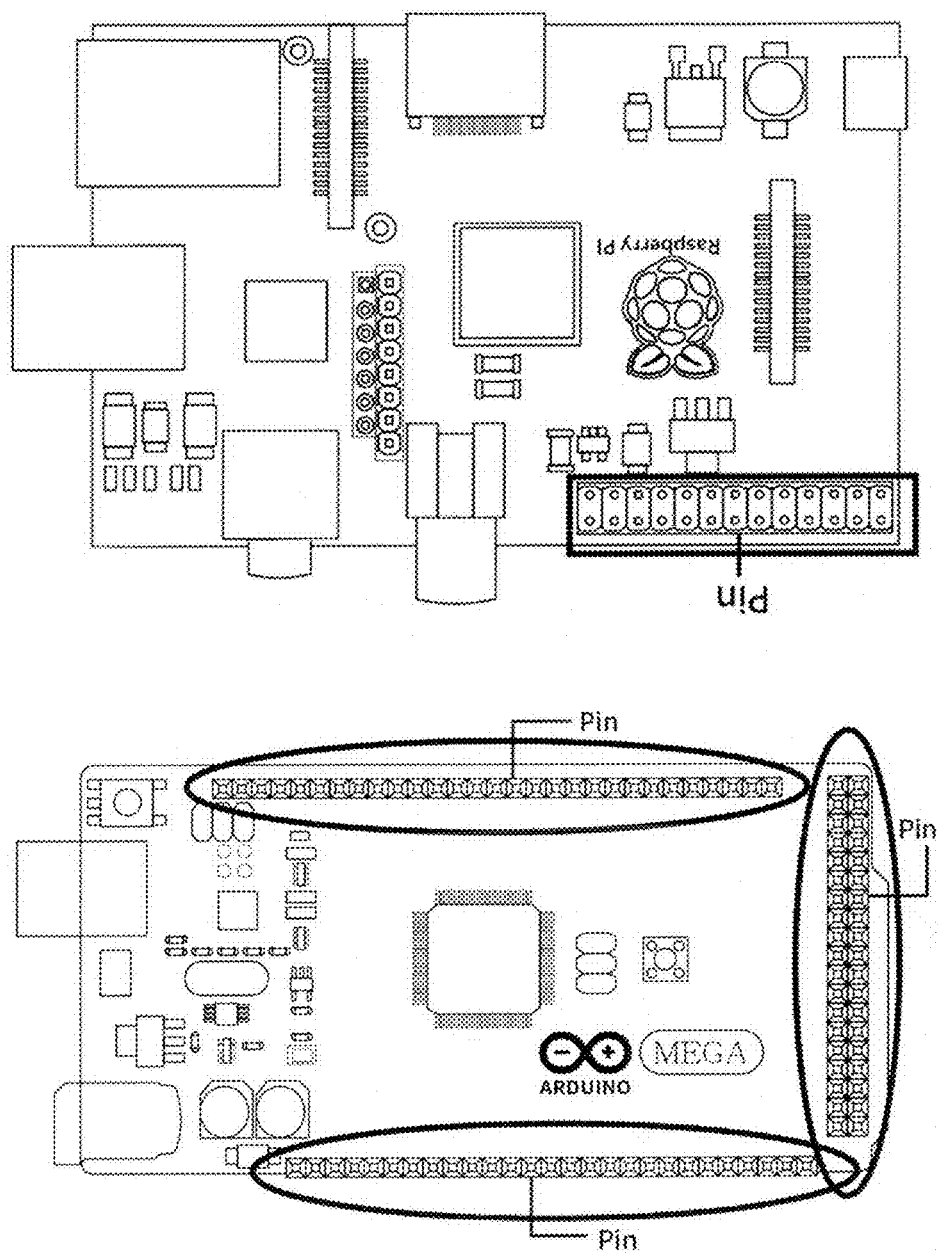
FIG. 2 shows some commonly seen development boards for illustration of pin forms.

The development board scanning module 100 can scan I/O pins of a development board 200. In practice, the development board scanning module 100 reads signals from a specific pin, such as Vcc or GND, waiting for scanning for further judgment by several probes 102 inserted into the specific pin when the development board 200 is electrically connected to a power source and received voltage signals provided through I/O pins 204. The number of the probe 102 is not limited. It only has to fulfill the purpose of scanning each pin. Regarding the pins, please refer to FIG. 2. FIG. 2 shows some commonly seen development boards. The development board on the left of FIG. 2 has several I/O pins. It has a form of a slot (as the area enclosed by an ellipse). The right development board has a GPIO (General-Purpose Input/Output) interface (enclosed by a solid frame), having a number of I/O pins inside, and in form of pins. For the latter, based on practical purposes, the probes 102 may be replaced by Dupont lines. Please notice that the development board 200 used by the present invention can be any kind of development boards in any forms. It is not limited to what is shown in FIG. 2. The development board 200 may be the development boards conform to public specifications in the market. It can also be a board designed for a special purpose out of a person or a company (e.g. developing of devices with embedded systems).

By scanning I/O pins of the development board 200, the development board scanning module 100 is able to acquire some information about the development board 200: specifications of controllers and hardware, definition of the I/O pins, and functions set for the controllers. The development board scanning module 100 can record the acquired data mentioned above in a development board functional database 162. It can also transmit the said definition of the I/O pins to a web server 130 via a network 300, directly or indirectly. Since the codes programmed by the programming system 10 is used to control some operating function of a specific object, such as a remote controller 250 in the present embodiment, where the operating function is not defined but should be achieved by the specific object, the development board scanning module 100 can get current settings of the operating function and pass them to the web server 130. For example, originally, the remote controller 250 can let a robot to rotate its arms at 30°, 45°, and 60°, or only rotate the right arm. Actually, arms of the robot can rotate from 0° to 80°. The left arm can rotate as well but it is not easy to design the keys to achieving all angles in a controller. With the programming system 10, the remote controller 250 can be easily designed to rotate at all possible angels.

As mentioned above, the web server 130 and the development board scanning module 100 are remotely connected. Key parts of the web server 130 include a device database 132 and an instruction database 134. The device database 132 is used to define and access the specifications of controllers and hardware, I/O pins, and functions set for the controllers of a number of devices and/or boards. The devices mentioned above refer to circuit boards and components thereon of commercial products. Each pin has specific functions. The boards are development boards disclosed or with public specifications. Pins and some hardware of the boards may not be defined. No matter it is a device or a board, ready functions and definition of pins can be used by the development board 200. In the present embodiment, the device database 132 has many data with respect to remote controllers, or data for developing the development boards of remote controllers.

The instruction database 134 is used to access instructions (or control codes) for setting the functions for the controllers of the devices and boards in the device database 132. These instructions are programmed by the low-level programming language mentioned above but functions driven by the instructions are not limited as the devices or boards define. For example, instructions for a controller of the remote controller 250 in the instruction database 134 may comprise control of both arms and rotation from 0° to 80°. However, the remote controller 250 can only control the right arm of the robot with rotation from 30° to 60°.

The working host 160 in the present embodiment is a laptop computer and capable of wireless network connection. It is connected to the development board scanning module 100 and the web server 130. In practice, the working host 160 can also be a desktop computer or a tablet. It should be noticed that the working host 160 must use the same communication specification and interface as that used by the development board scanning module 100. For example, the communication may go through USB cables and link via USB interface. It may also conduct wireless communication via a Bluetooth module. The working host 160 has the mentioned development board functional database 162. The working host 160 can provide a platform for programming codes of a high-level programming language. Of course, the high-level programming language may further be in a form of a graphic design interface to provide a more convenient way of operation to users.

The working host 160 has a very important element according to the present invention: an application programming interface packaging module 164○ The application programming interface packaging module 164 can encapsulate the application interface used by the high-level programming language with data in the device database 132, the instruction database 134, and/or the development board functional database 162. It can provide an API used by the high-level programming language to program and control the operating function. Similarly, the high-level programming language can be further in a form of a graphic design interface to provide a more convenient way of operation to users. After receiving codes programmed by the high-level programming language, the application interface compiles the codes into instructions coded by a low-level programming language used to communicate with the development board 200. Namely, the instructions in the instruction database 134 may be properly adjusted by the complied codes of the high-level programming language. For example, codes of the high-level programming language are used to set up the development board 200 to have a function of rotation of the left hand of the robot from 0° to 75°. By compilation of the application interface, it is possible to use the instructions coded by the low-level programming language to finish the job. It should be noticed that the application programming interface packaging module 164 may be software running in the working host 160. It may also be hardware installed in the working host 160. The application programming interface packaging module 164 co-works with the working host 160. The application interface does not operate unidirectionally. It can also translate a result of operations of the instructions or information from the development board 200, from the codes coded by the low-level programming language into a message for the high-level programming language, so that developers can know the result or information.

Figure 3:
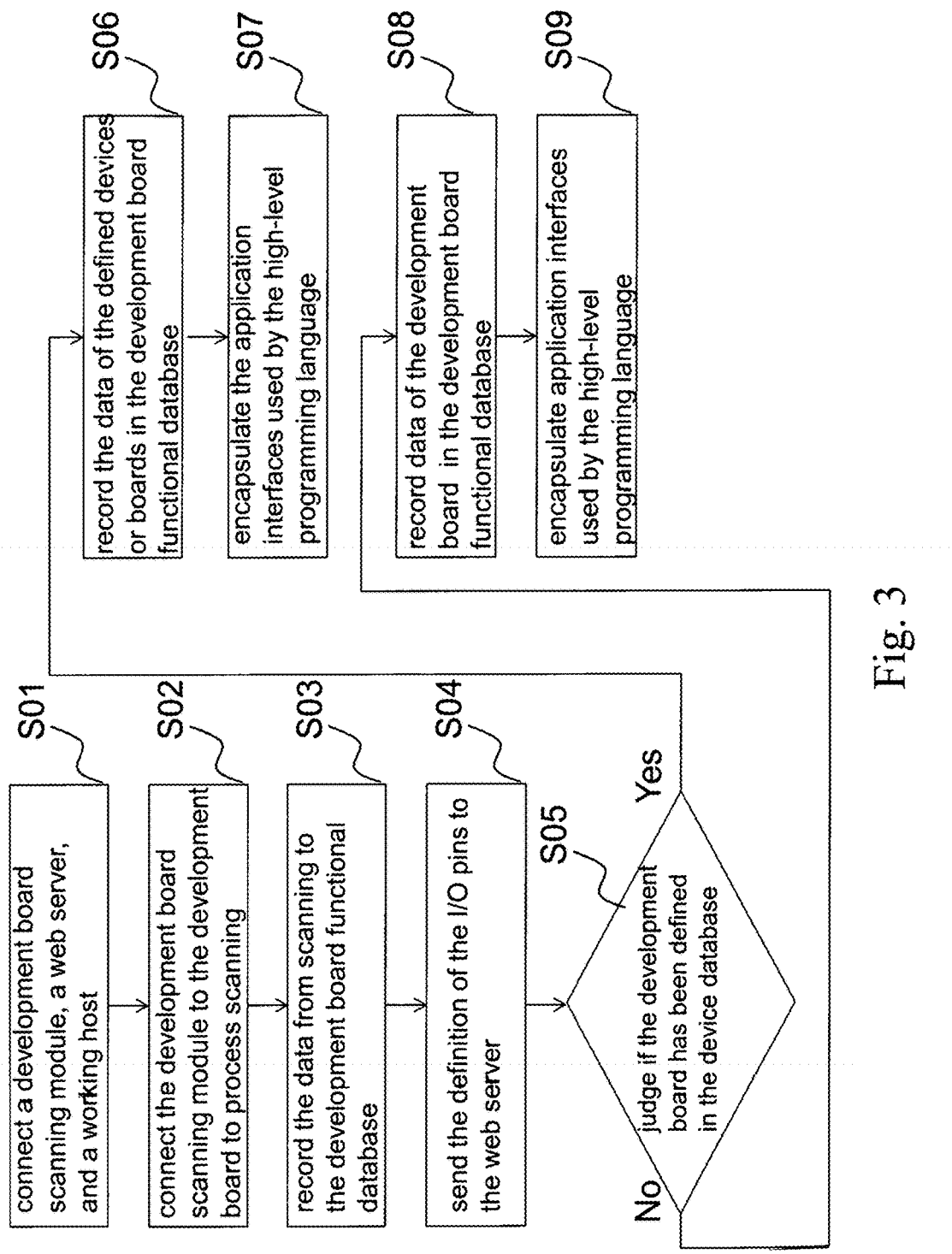
FIG. 3 is a flowchart of processes of operating a programming system for device control according to the present invention.

Please see FIG. 3. A flow chart of processes of operation of the programming system 10 is illustrated. First, connect the development board scanning module 100, the web server 130, and the working host 160 through the network 300 (S01), where the development board scanning module 100 is indirectly connected with the web server 130 via the working host 160. Next, connect the probes 102 of the development board scanning module 100 to the I/O pins 204 of the development board 200 to process scanning (S02). The working host 160 records the data, such as specifications of controllers and hardware, definition of the I/O pins, and functions set for the controllers of the development board 200, available from scanning to the development board functional database (S03). Meanwhile, the working host 160 sends the definition of the I/O pins to the web server 130 (S04). Authentication of the board processes.

The authentication is that the web server 130 judges if the development board 200 has been defined in the device database 132 by the received definition of the I/O pins (S05). That is to say that by the definition of the I/O pins, it is judged whether specifications of controllers and hardware, I/O pins, and functions set for the controllers defined in the device database 132 are the same as that of the development board 200. If the judgement is yes, then the web server 130 sends the specifications of controllers and hardware, and functions set for the controllers of the defined devices or boards to the working host 160, further being recorded in the development board functional database 162 (S06). Afterwards, the web server 130 provides the specifications of controllers and hardware, functions set for the controllers, and instructions for setting the functions for the controllers of defined devices or boards to the application programming interface packaging module 164, for encapsulating the application interfaces used by the high-level programming language (S07). It is to say that the application interfaces are only made for the current device or board. Extra function is not available. For example, the device database 132 has a remote controller of type E123. It processes remote control with infrared. There is another board of type KK57 for robot remote control. It runs remote control via Bluetooth. If the encapsulating is carried on with data related to the type of E123, the application interfaces won't accept instructions over the connection of Bluetooth.

If the judgement is no, then the working host 160 records scanned specifications of controllers and hardware, definition of the I/O pins, and functions set for the controllers of the development board 200 in the development board functional database 162 (S08). Next, the working host 160 provides the specifications of controllers and hardware, functions set for the controllers, and instructions for setting the functions for the controllers of the development board 200 obtained by scanning to the application programming interface packaging module 164, encapsulating application interfaces used by the high-level programming language (S09).

It should be noticed that an control module 202 is a tool controlled by the application interfaces. If a developer uses a development board which is not or not related to the type E123, it is required first to define its functions and pins corresponding to the development board 200 in the development board functional database 162. For example, PIN 11 and PIN 12 are exclusive pins for the control module 202. Similarly, other functions are required to be defined in this way. After all the steps above are completed, the developer can use the platform for programming codes of the high-level programming language provided by the working host 160 to develop desired control codes. Codes of the low-level programming language complied from the control codes are used for controlling a function of the development board 200. A single action or a series of actions may be executed by the development board 200. If the codes for the development board 200 can be applied to other different remote controllers, namely, it collects instructions applicable to hardware and a controller of the development board 200 from the instruction database 134, the development board 200 becomes a multi-functional remote control.

According to the spirit of the present invention, the said operating function does not have to be available from scanning pins by the development board scanning module 100. The operating function may be sent to the development board 200 via a connecting channel and fetched by the development board scanning module 100 from an external board, e.g. the board of the remote controller 250. For example, the remote controller 250 has a communication module 252. The communication module 252 sends a message to the control module 202 where the message is the remote controller 250 can open its legs at 90 degrees. There are corresponding instructions in the instruction database 134 but current devices or boards don't utilize. Through communicating with the remote controller 250, by encapsulating application interface, the above function can be initiated. The mentioned connecting channel is not limited to wireless transmission using a wireless communication interface, such as an infrared communication module, a Wi-Fi communication module, a Bluetooth communication module, a RF communication module, a LTE communication module, or a WiMAX communication module. It can also be wired transmission. Usually, data go through the wired transmission can be two-way communication and can be and achieved by an interface, such as a USB (Universal Serial Bus) port, an eSATA (external Serial Advanced Technology Attachment) port, or a Thunderbolt port.

Figure 4:
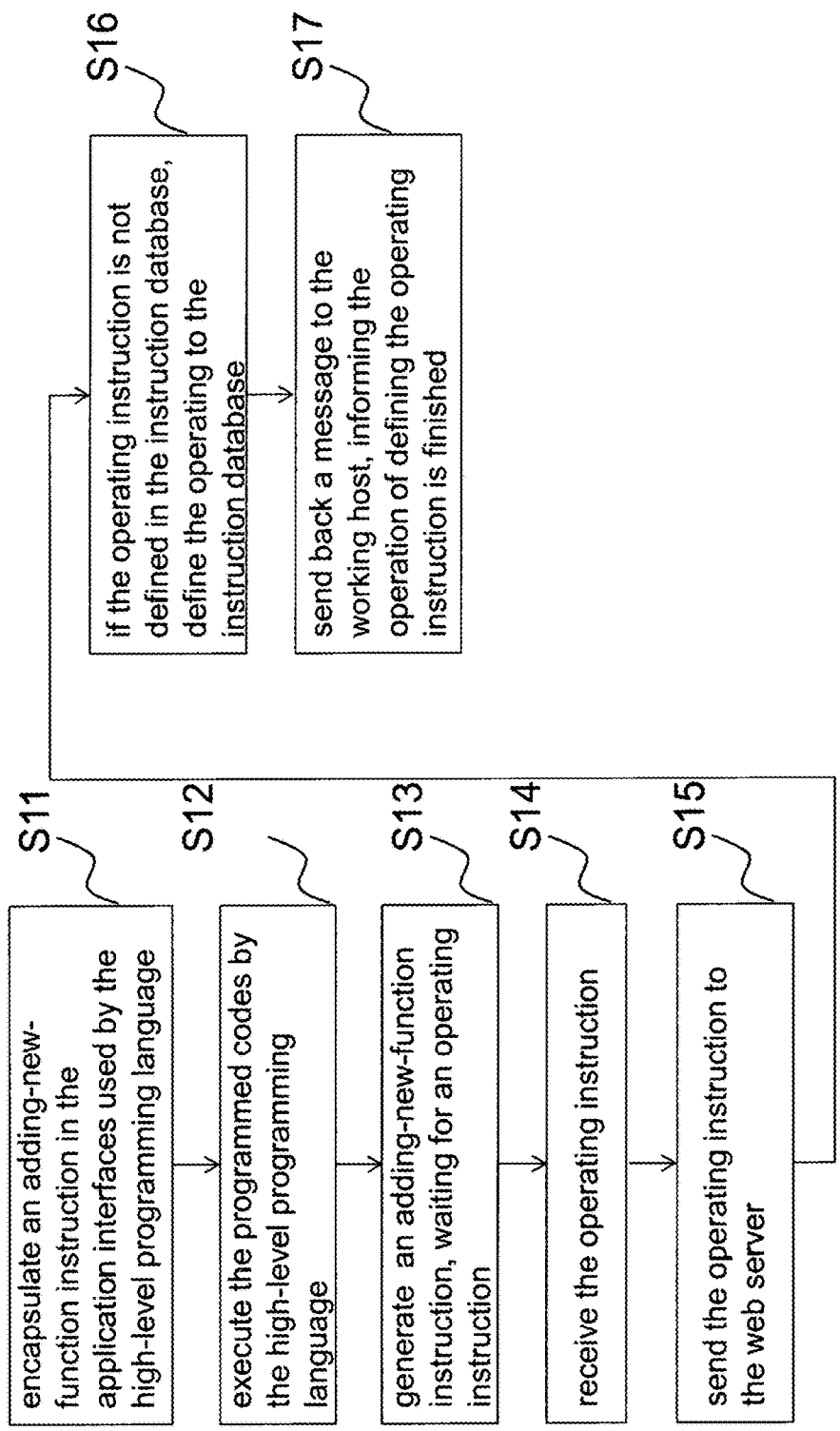
FIG. 4 is a flowchart of processes of adding instructions.

Another embodiment of the present invention can let users to define new instructions for the operating function. The instruction database 134 doesn't include these new instructions but new instructions indeed can be executed in one device. The operating processes are shown in FIG. 4. For illustrative purpose, the new instructions are defined operating instructions. An operating function of a current device (e.g. the remote controller 250 in the previous embodiment) is executed by the operating instructions.

When the application programming interface packaging module 164 encapsulates the application interfaces used by the high-level programming language, besides encapsulation processed for the data from scanning development board 200 or provided by the web server 130, an adding-new-function instruction is encapsulated (S11). Then, it executes the programmed codes by the high-level programming language (S12). Now, the application interface will generate an adding-new-function instruction, a purpose of the instruction is to wait for an operating instruction, sent from the remote controller 250 to the development board 200 (S13). After the operating instruction is received (S14), the application interface sends the operating instruction to the web server 130 (S15). If the web server 130 judges that the operating instruction is not defined in the instruction database 134, the web server 130 defines the operating to the instruction database 134 (S16). When the operation for defining the operating instruction finishes, the application interface will send back a message to the working host 160, informing the user that the operation is finished (S17).

There is another situation that the operating instruction can be defined by users. Such situation is that the users use the low-level programming language to develop the operating instruction. With the operation mentioned above, the operating instruction is added into the instruction database 134.

In the present invention, the development board 200 operated by the control codes generated from the programming system 10 is not limited to be applied to remote controllers. Other devices developed conform to the operation of the programming system 10 can be applied, for example, some devices with an embedded system.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A programming system for device control, comprising:
   a development board scanning module, for acquiring an operating function of a development board, specifications of controllers and hardware, definition of the I/O pins, and functions set for the controllers by scanning I/O pins of a development board;
   a working host, connected to the development board scanning module, comprising:
      a development board functional database, for providing a platform for programming codes of a high-level programming language and an application interface used by the high-level programming language to program and control the operating function of the development board; and
      an application programming interface packaging module, for translating codes of the high-level programming language into codes of a low-level programming language; and
   a web server, connected to the working host, comprising:
      a device database, for defining and accessing the specifications of controllers and hardware, I/O pins, and functions set for the controllers of a plurality of devices and/or development boards; and
      an instruction database, for accessing instructions for setting the functions for the controllers; wherein the application programming interface packaging module encapsulates the application interface used by the high-level programming language with data in the device database, the instruction database, and/or the development board functional database;
   wherein the application interface compiles the codes into instructions coded by a low-level programming language used to communicate with the development board after receiving the codes of the high-level programming language;
   wherein the operating function of the development board, specifications of controllers and hardware, definition of the I/O pins, and functions set for the controllers acquired by the development board scanning module are transmitted to the working host and recorded in the development board functional database of the working host; and
   wherein the development board scanning module is indirectly connected with the web server via the working host.

2. The programming system for device control according to claim 1, wherein the web server judges if the development board has been defined in the device database by the received definition of the I/O pins.

3. The programming system for device control according to claim 2, wherein if a result of the judgment is yes, record the specifications of controllers and hardware of the defined devices or development boards, and functions set for the controllers in the development board functional database.

4. The programming system for device control according to claim 3, wherein the specifications of controllers and hardware of the defined devices or development boards, functions set for the controllers, and instructions for setting the functions for the controllers are provided to the application programming interface packaging module, for encapsulating the application interfaces used by the high-level programming language.

5. The programming system for device control according to claim 2, wherein if a result of the judgment is no, record the acquired specifications of controllers and hardware of the development board, definition of the I/O pins, and functions set for the controllers in the development board functional database.

6. The programming system for device control according to claim 5, wherein specifications of controller and hardware, functions set for the controllers, and instructions with respect to set the controller functions of the development board acquired by scanning are provided to the application programming interface packaging module, for encapsulating application interfaces used by the high-level programming language.

7. The programming system for device control according to claim 1, wherein the operating function is sent to the development board from an external board via a connecting channel.

8. The programming system for device control according to claim 7, wherein the connecting channel is wireless communication interface or a wired transmission interface.

9. The programming system for device control according to claim 8, wherein the wireless communication interface is an infrared communication module, a Wi-Fi communication module, a Bluetooth communication module, a RF communication module, a LTE communication module, or a WiMAX communication module.

10. The programming system for device control according to claim 8, wherein the wired transmission goes through a USB (Universal Serial Bus) port, an eSATA (external Serial Advanced Technology Attachment) port, or a Thunderbolt port.

11. The programming system for device control according to claim 1, wherein the operating function is operated by an operating instruction.

12. The programming system for device control according to claim 11, wherein if an operating instruction is not defined in the instruction database, the web server further defines the operating instruction into the instruction database.

13. The programming system for device control according to claim 11, wherein the operating instruction is defined by users.

14. The programming system for device control according to claim 1, wherein the working host is a laptop computer, a desktop computer, or a tablet.

15. The programming system for device control according to claim 1, wherein the application programming interface packaging module is software running in the working host, or hardware installed in the working host.

* * * * *